*Lester & Jennings,*
*Derrick.*
Nº 64,336. Patented Apr. 30, 1867.
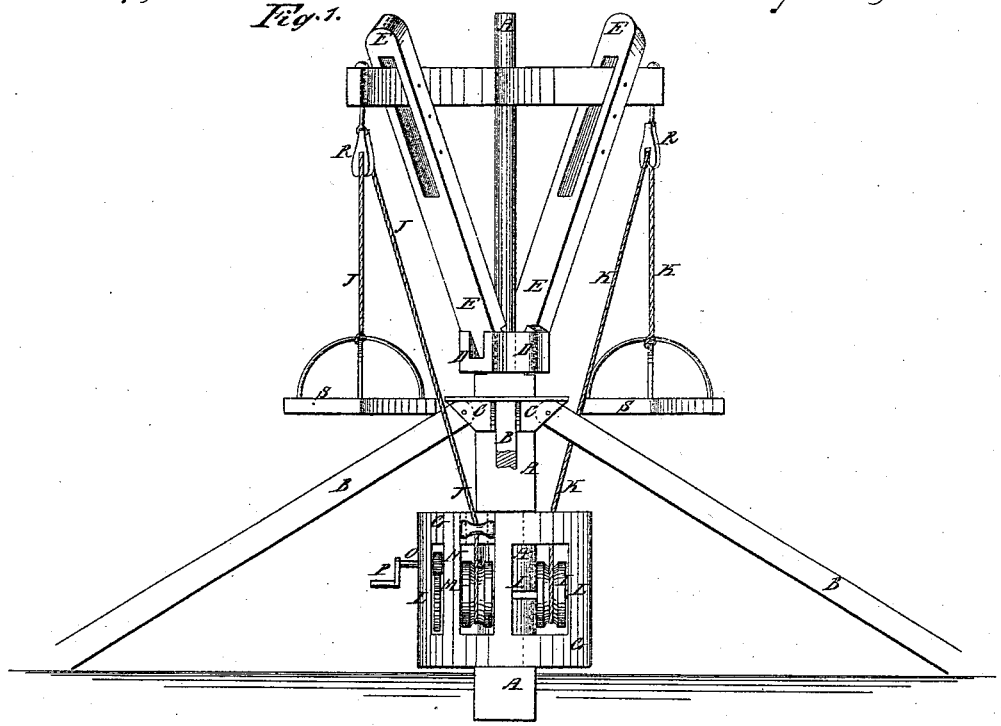
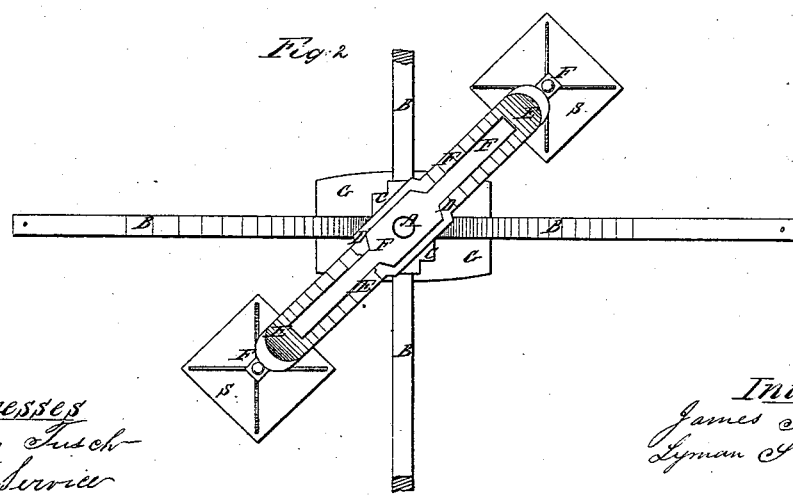
Witnesses
Theo Tusch
J. A. Service
Inventor
James T. Lester
Lyman S. Jennings
Attorneys

United States Patent Office.

JAMES S. LESTER AND LYMAN G. JENNINGS, OF LAFAYETTE, INDIANA.

Letters Patent No. 64,336, dated April 30, 1867.

IMPROVEMENT IN DERRICKS.

*The Schedule referred to in these Letters Patent and making part of the same.*

TO ALL WHOM IT MAY CONCERN:

Be it known that we, JAMES S. LESTER and LYMAN G. JENNINGS, of Lafayette, in the county of Tippecanoe, and State of Indiana, have invented a new and useful Improvement in Derrick; and we do hereby declare that the following is a full, clear, and exact description thereof, which will enable others skilled in the art to make and use the same, reference being had to the accompanying drawings, forming part of this specification, in which—

Figure 1 is a side view of our improved derrick, part of one brace being broken away to show the construction.

Figure 2 is a top view of the same.

Similar letters of reference indicate like parts.

Our invention has for its object to furnish an improved derrick for raising brick, mortar, and other building materials to the place where they are to be used; and it consists in the combination of the revolving or swinging adjustable frame, revolving pulley-box or frame, adjustable brace, and upright shaft with each other, as hereinafter more fully described. The derrick is designed to be placed either inside or outside of the building being erected, as may be most convenient, but we generally prefer to place it outside, as in that case the materials can usually be more readily brought to it.

A is the vertical post or cylinder, the lower end of which may rest upon the surface of the ground or in a hole dug for its reception. The cylinder A is held in an erect position by the adjustable braces B, the upper ends of which are pivoted in iron sockets, C, attached to the said cylinder, and their lower ends are secured to the ground by stakes or pins driven through holes in the said lower ends and into the ground. By this construction the braces B may be adjusted so as to hold the cylinder A vertical, however uneven may be the surface of the ground upon which the derrick is placed. D is a block, through which the upper part of the cylinder A passes, and which rests upon a shoulder formed upon the middle part of said cylinder or post by rounding off its upper part, as shown in fig. 1. To the ends of the block D are pivoted the lower ends of the adjustable supporting timbers E, as shown in fig. 1. The upper parts of the timbers E are slotted for the reception of the ends of the horizontal timber F. The upper end of the cylinder A passes through a hole in the centre of the said timber F, so that it may revolve or swing freely about the said cylinder. The timber F is supported by pins passing through holes in the ends of the said timber and through one or the other of the holes through the timbers E, according to the height to which the building materials are to be raised. G is the box or frame in which the pulleys H I are placed. This frame is attached to and revolves about the lower part of the cylinder A, as shown in fig. 1, so that the ropes J K may be free to accommodate themselves to the position to which the upper part of the derrick may be swung. The shaft L, to which the pulleys H and I are attached, revolves in bearings in the frame or box G. M is a gear-wheel securely attached to the pulley-shaft L, and which, as it is revolved, carries with it the shaft L and pulleys H I. N is a gear-wheel attached to the crank-shaft O, the teeth of which mesh into the teeth of the gear-wheel M. P is a crank attached to the end of the crank-shaft O, as shown in fig. 1. J and K are ropes, the ends of which are attached to the pulleys H and I in such a way that as the one rope is wound upon its pulley, raising the platform attached to its other end, the other rope is unwound, lowering its platform. The ropes J and K pass from the pulleys H and I up to the ends of the timber F, where they pass around the pulleys of the boxes R, which are swivelled to the ends of the said timber. S are platforms attached to the ends of the ropes J and K, upon which the brick, mortar, or other material is raised to the desired place.

In using the machine, it is secured in a vertical position in the manner before described. The lower platform is then loaded with brick, mortar, or other material, and by operating the crank P the loaded platform is raised and the unloaded one lowered. Then, by drawing the rope of the unloaded platform in one direction the loaded platform is swung in the opposite direction, and may thus be guided to the place where the material is wanted.

What we claim as new, and desire to secure by Letters Patent, is—

1. The combination of the revolving or swinging adjustable frame D E F with the vertical post or cylinder A, substantially as herein shown and described.

2. The combination of the revolving pulley-box G with the vertical post or cylinder A, substantially as herein shown and described.

3. An improved derrick, formed by the combination of the pulley-box or frame G, the adjustable frame D E F, the vertical post or cylinder A, and the adjustable braces B with each other, substantially as herein shown and described.

4. Connecting the ropes J K and pulleys H I with each other, with pulley-box or frame G, and with the swinging frame D E F in such a way that one of the platforms attached to said ropes may be raised at the same time and by the same operation by which the other one is lowered, substantially as herein shown and described.

JAS. S. LESTER,
LYMAN G. JENNINGS.

Witnesses:
   A. J. MORLEY,
   E. S. LEMON.